United States Patent
Li et al.

(10) Patent No.: US 9,672,590 B2
(45) Date of Patent: Jun. 6, 2017

(54) IMAGE INTERPOLATION METHOD AND DEVICE BASED ON AUTOREGRESSIVE MODEL

(71) Applicants: Peking University, Beijing (CN); Peking University Founder Group Co., Ltd., Beijing (CN); Beijing Founder Electronics Co., Ltd., Beijing (CN)

(72) Inventors: Mading Li, Beijing (CN); Jiaying Liu, Beijing (CN); Jie Ren, Beijing (CN); Zongming Guo, Beijing (CN)

(73) Assignees: PEKING UNIVERSITY FOUNDER GROUP CO. LTD., Beijing (CN); BEIJING FOUNDER ELECTRONICS CO., LTD., Beijing (CN)

( * ) Notice: Subject to any disclaimer, the term of this patent is extended or adjusted under 35 U.S.C. 154(b) by 188 days.

(21) Appl. No.: 14/434,975

(22) PCT Filed: Nov. 6, 2013

(86) PCT No.: PCT/CN2013/086583
§ 371 (c)(1),
(2) Date: Apr. 10, 2015

(87) PCT Pub. No.: WO2014/082523
PCT Pub. Date: Jun. 5, 2014

(65) Prior Publication Data
US 2015/0262334 A1 Sep. 17, 2015

(30) Foreign Application Priority Data

Nov. 28, 2012 (CN) .......................... 2012 1 0495044

(51) Int. Cl.
*G06T 3/40* (2006.01)
*G06T 5/50* (2006.01)

(52) U.S. Cl.
CPC .............. *G06T 3/4007* (2013.01); *G06T 5/50* (2013.01); *G06T 2207/20224* (2013.01)

(58) Field of Classification Search
CPC G06T 3/4007; G06T 5/50; G06T 2207/20224
See application file for complete search history.

(56) References Cited

U.S. PATENT DOCUMENTS

2012/0155550 A1  6/2012  Wu et al.

FOREIGN PATENT DOCUMENTS

| CN | 101378511 A | 3/2009 |
|----|-------------|--------|
| CN | 101378511 Y | 3/2009 |
| CN | 102479380 A | 5/2012 |

OTHER PUBLICATIONS

X. Zhang, X. Wu, "Image interpolation by 2-D autoregressive modeling and soft-decision estimation", IEEE Trans. Image Process., vol. 17, No. 6, pp. 887-896, Jun. 2008. Accessed at http://citeseerx.ist.psu.edu/viewdoc/download?doi=10.1.1.141.1589&rep=rep1&type=pdf on Jan. 20, 2017.*

(Continued)

*Primary Examiner* — Siamak Harandi
*Assistant Examiner* — Kate R Duffy
(74) *Attorney, Agent, or Firm* — Brinks Gilson & Lione

(57) ABSTRACT

An image interpolation method and device based on an autoregressive model. The method first, interpolating a low-resolution image up to a target scale to obtain an interpolated image M; determining a local area W in the image M to be interpolated, establishing two autoregressive models for each pixel point in the local area W except for the edge pixel points, and determining an initial objective function F0 according to the autoregressive models; down sam- (Continued)

pling the local area W except for the edge pixel points to the same size as the low-resolution image to obtain a local area W', subtracting a corresponding area in the low-resolution image from W' one pixel value by one pixel value, and adding the result to the initial objective function F0 to obtain an objective function F; performing iteration on the objective function F to obtain a pixel point value of a center block of W.

19 Claims, 4 Drawing Sheets

(56) References Cited

OTHER PUBLICATIONS

Article Entitled "Implicit Piecewise Autoregressive Model-Based Image Interpolation Algorithm," by Jie Ren et al., Institute of Computer Science and Technology, Department of Computer Intelligence Science, Peking University, Beijing, China; 11 pages.
International Search Report (Translated) of PCT/CN2013/086583, Mailed on Jan. 23, 2014, 4 pages.

\* cited by examiner

IMAGE INTERPOLATION METHOD AND DEVICE BASED ON AUTOREGRESSIVE MODEL

TECHNICAL FIELD

The present invention relates to the field of digital image enhancement, and more specifically, to an image interpolation method and device.

DESCRIPTION OF THE RELATED ART

The object of image interpolation is to generate an higher resolution image using information provided by an lower resolution image. In an image interpolation method, high resolution pixels are generally inserted between estimated pixels of an original low resolution image. These unknown high resolution pixels may be estimated from surrounding low resolution pixels thereof to obtain a high resolution image.

In a traditional bicubic interpolation algorithm, each high resolution pixel is calculated as a weighted average of its 16 surrounding low resolution pixels. Wherein, the larger distance from the high resolution pixel the low resolution pixels have, the smaller weights they are assigned. Such bicubic interpolation algorithm evaluates for all pixels using the same method and the same weights, making some important information (such as edges) obscured in the image.

For better representation of edge information, an autoregressive model with a low resolution pixel as a center has been introduced by Li et al. According to geometric duality, weight relationships between a high resolution pixel and its surrounding low resolution pixels are considered as similar to that between low resolution pixels themselves. Assuming that an image has constant structural properties within a smaller area, they applied the autoregressive model on low resolution pixels within a small area of an image to calculate weights on this small area, and in turn calculate high resolution pixels in this area.

Zhang et al developed the work of Li et al by adding an autoregressive model with a high resolution pixel as a center in the algorithm in such a consideration that irrespective of a high resolution pixel or a low resolution pixel used as the center, all autoregressive models are supposed to have the same weights, which may further improve the performance of the algorithm.

It has been found by Ren et al that the assumption of having constant structural properties within a small area of an image is actually untenable for some situations. They carried out similarity measurement between pixels within a small area of an image, and assigned higher weight values for pixels having a similar structure with the center pixel to be output.

However, all the above methods are directed to the situation of scaling factor 2, in which case there are a large amount of low resolution pixels with constant positions surrounding a high resolution pixel.

FIG. 1 shows position relationships between high resolution pixels (white points) and low resolution pixels (black points) after amplification on different scales. In FIG. 1(a), the scaling factor is 2, and only one high resolution pixel may be inserted between two low resolution pixels; in FIG. 1(b), the scaling factor is 1.5, and two high resolution pixels may be inserted between two low resolution pixels; FIG. 1(c) shows a more generalized situation, in which if the scaling factor is a rational number s, N is the smallest integer time of s.

SUMMARY OF THE INVENTION

In view of the defects in the prior art, a technical problem to be solved in this invention is to provide an efficient and effective image interpolation method based on an autoregressive model.

In order to solve the above problems, a technical solution adopted in this invention is as follows.

An image interpolation method based on an autoregressive model, comprising the following steps:

(1) up interpolating a low resolution image to a target scale to obtain an up-interpolated image M;

(2) determining a local area W to be interpolated in the image M, establishing two autoregressive models, a horizontally perpendicular autoregressive model and a 45 degree diagonal autoregressive model, for each pixel point in the local area W except for the edge pixel points, and determining an initial objective function F0 according to the autoregressive models;

(3) down sampling the local area W except for the edge pixel points to the same size as that of the low-resolution image, so as to obtain a local area W', subtracting a corresponding area in the low-resolution image from the local area W' on the basis of each pixel and adding the result to the initial objective function F0, so as to obtain an objective function F;

(4) solving the objective function F iteratively, so as to obtain pixel values of a centre block of the local area W.

An image interpolation device based on an autoregressive model, comprising:

an image up-interpolation unit for up interpolating a low resolution image to a target scale to obtain an up-interpolated image M;

an autoregressive model establishment unit for determining a local area W to be interpolated in the image M, establishing two autoregressive models, a horizontally perpendicular autoregressive model and a 45 degree diagonal autoregressive model, for each pixel point in the local area W except for the edge pixel points;

an initial objective function determination unit for determining an initial objective function F0 according to the autoregressive models;

an objective function acquisition unit for down sampling the local area W except for the edge pixel points to the same size as that of the low-resolution image, so as to obtain a local area W', subtracting a corresponding area in the low-resolution image from the local area W' on the basis of each pixel and adding the result to the initial objective function F0, so as to obtain an objective function F;

a center pixel iterative evaluation unit for performing iteration on the objective function F, so as to obtain a pixel point value of a centre block of the local area W.

With the method of this invention, through establishing autoregressive models for all pixels and introducing improved weight analysis to get a final solution iteratively, the performance of the image interpolation method based on autoregressive models may be improved.

Further, in the iterative calculation, weight values are adjusted in consideration that the two autoregressive models may have different ratios, which may result to a more accurate estimation.

Further, when outputting, instead of a center point, a center block of pixels is outputted, so that the performance of the image interpolation method based on autoregressive models may be further improved, and the time required to execute the interpolation method may be reduced.

DETAILED DESCRIPTION OF THE PREFERRED EMBODIMENT

Below, particular embodiments of this invention will be described in detail with reference to accompanying drawings.

Figure 1:
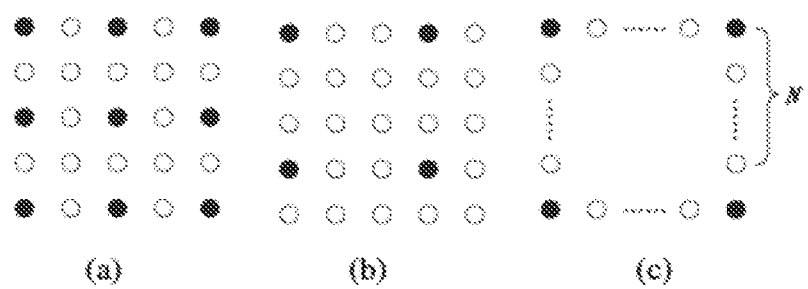
FIG. 1 is a schematic diagram showing position relationships between high resolution pixels and low resolution pixels after amplification on different scales in the prior art.
Figure 2:
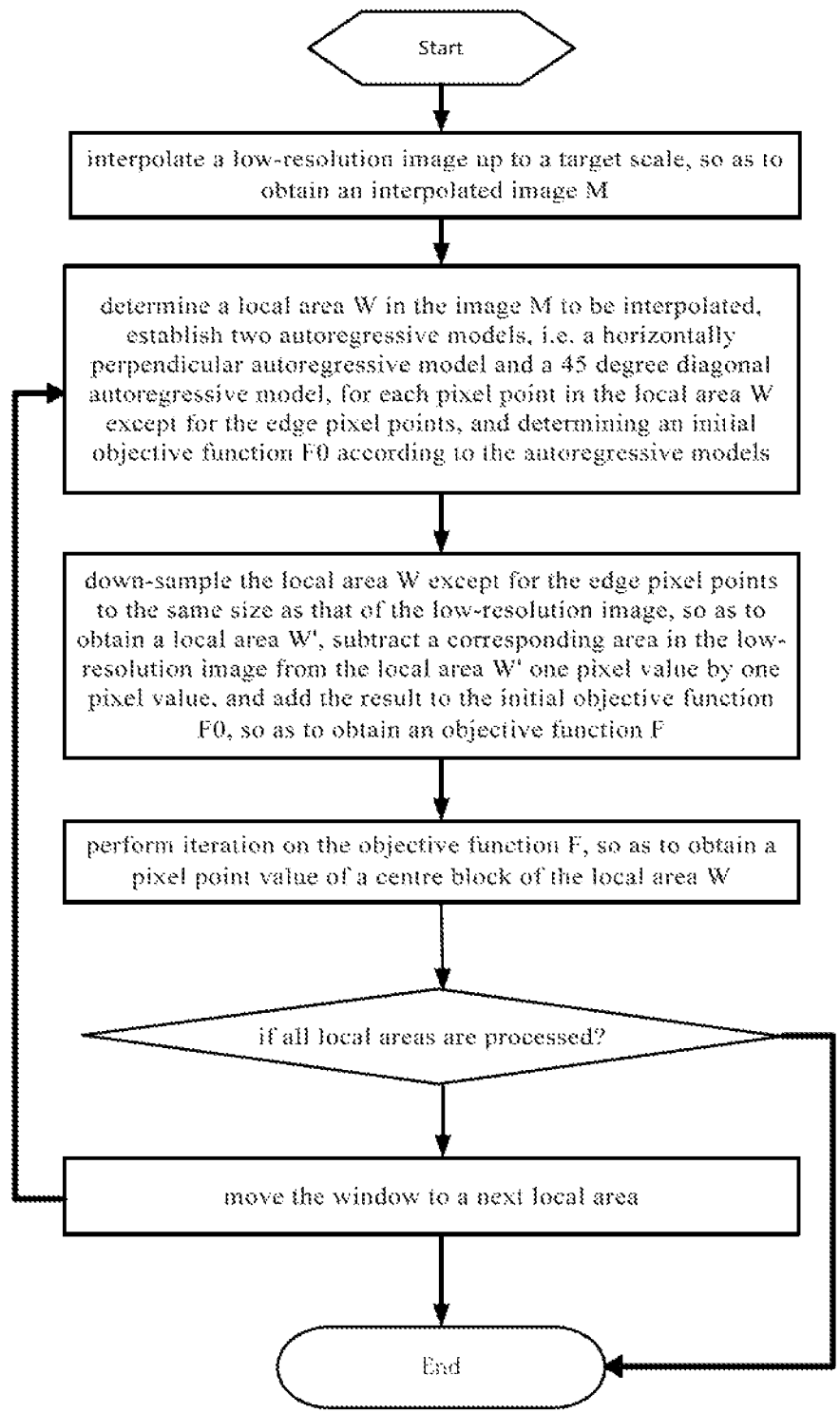
FIG. 2 is a flowchart of an image interpolation method performed on any scale based on autoregressive models according to an embodiment of this invention.

As show in FIG. 2, the image interpolation method performed on any scale based on autoregressive models according to an embodiment of this invention comprises the following steps:

(1) up interpolating a low resolution image (an image to be interpolated) to a target scale to obtain an up-interpolated image M.

Figure 3:
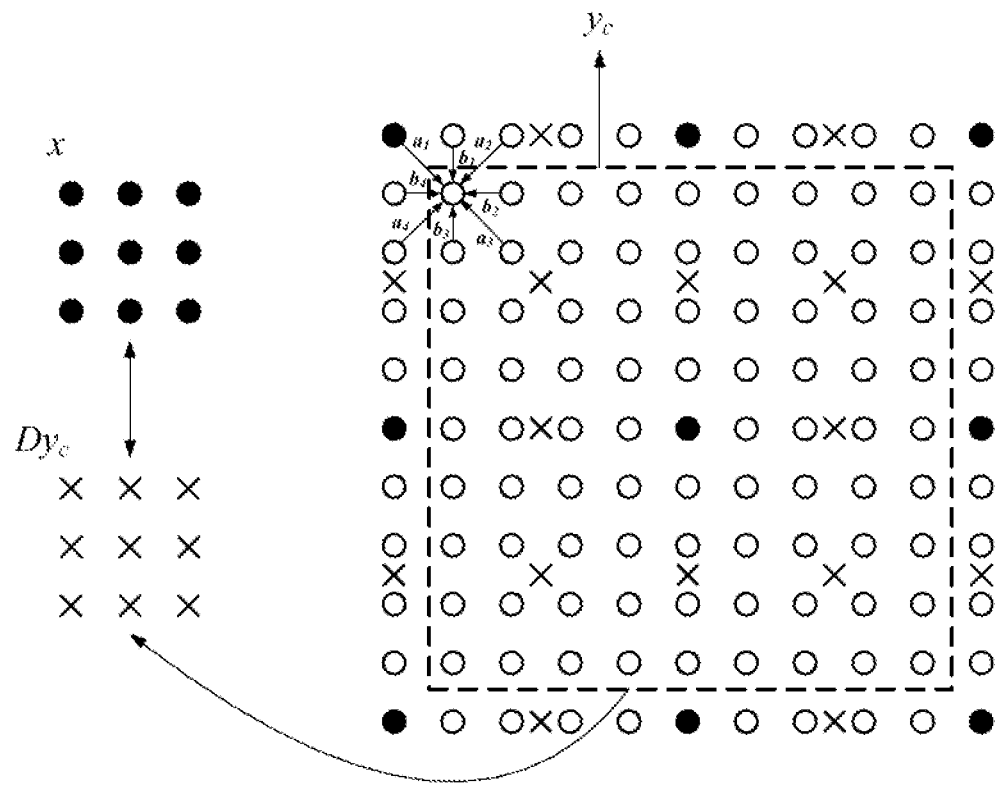
FIG. 3 is a schematic diagram of a process of establishing autoregressive models in a local area with a scale factor of 2.5 according to an embodiment of this invention.

For example, the low resolution image is up interpolated to a target scale using a bicubic interpolation algorithm. As shown in FIG. 3, a 3*3 low resolution image is magnified to 2.5 times of its original size. After bicubic interpolation, the black spots are low resolution pixels on integer positions, crosses are low resolution pixels that are not on integer positions, and white spots are high resolution pixels.

The bicubic interpolation method is an existing method, which will not be described in detail herein. See reference: Keys, R., Cubic convolution interpolation for digital processing, IEEE Transactions on Acoustics, Speed and Signal Processing, vol. 29, issue. 6, Dec. 1981.

(2) determining a local area W to be interpolated in the image M, establishing two autoregressive models, a horizontally perpendicular autoregressive model and a 45 degree diagonal autoregressive model, for each pixel point in the local area W except for the edge pixel points, and determining an initial objective function F0 according to the autoregressive models.

The range of the local area W is, for example, 7*7 pixels to 15*15 pixels. In this embodiment, the local area W has a size of 11*11 pixels. The horizontally perpendicular autoregressive model is composed of a pixel and its four up, down, left, right neighboring pixels, and the 45 degree diagonal autoregressive model is composed of a pixel and its four up-left, up-right, down-left and down-right neighboring pixels. As shown in FIG. 3, except for pixels on edges (because some neighboring pixels thereof are positioned outside of the local area), the horizontally perpendicular autoregressive model of the pixel on the top left corner is composed of the top left corner pixel and its four up, down, left and right neighboring pixels, wherein b1, b2, b3, b4 are weight values in various directions. The 45 degree diagonal autoregressive model is composed of the pixel and its four up-left, up-right, down-left and down-right neighboring pixels, wherein a1, a2, a3, a4 are weight values in various directions.

Each autoregressive model assigns weights to the surrounding pixels and subtracts them from the center pixel. All autoregressive models are summed up over the complete area, with a final object of minimizing the summation. That is, the more accurate the weight values are, the closer the estimated value approaches to its real value. The initial objective function F0 is as follows:

$$\min_{y,a,b}\{\alpha\|y_c - Ay\|^2 + \beta\|y_c - By\|^2\}$$

Wherein, y is a column vector composed of all pixels in the local area W, a and b are an one-dimensional vector composed of four weight values of the 45 degree diagonal autoregressive model and an one-dimensional vector composed of four weight values of the horizontally perpendicular autoregressive model, wherein all the initial weight values are ¼. Yc is a column vector composed of all pixels that may be the centers of the autoregressive models in the local area W (non-edge pixels). A and B are weight value matrixes of the two autoregressive models, which are constructed as follows: if the jth pixel of the local area W is a 45 degree diagonal neighbor of the ith pixel of W, the item on the ith row and the jth column of A is the kth weight value of A. The same is true of B. α and β are ratios of the two autoregressive models, with values in a range from 0.1 to 1 respectively, which may be obtained experimentally. For an image, a PSNR value may be obtained from each pair of α and β (a commonly used test measure in the image field). It has been found through a large amount of experiments: the algorithm has the best effect when α is about 0.2 and β is about 0.3.

(3) down sampling the local area W except for the edge pixel points to the same size as that of the low-resolution image using bicubic interpolation for example, so as to obtain a local area W', subtracting a corresponding area in the low-resolution image from the local area W' on the basis of each pixel and adding the result to the initial objective function F0, so as to obtain an objective function F. The initial objective function F0 is converted to a objective function F as follows:

$$\min_{y,a,b}\{\alpha\|y_c - Ay\|^2 + \beta\|y_c - By\|^2 + \lambda\|x - Dy_c\|^2\}$$

Wherein, x represents a column vector composed of pixels in an area of the low resolution image corresponding to the local area W', D represents a down sampling matrix of the bicubic interpolation method, λ represents weight values in a range (0, 1), in general 0.5.

(4) solving the objective function F iteratively, so as to obtain a pixel value of a centre block of the local area W, particularly comprising the following steps:

① calculating similarity with the center block for all blocks in the local area W.

The center block is a rectangular image block with the center pixel of the local area W as its center. The center block and the block have a size ranging from 3*3 pixels to 5*5 pixels, the both remaining the same size. The similarity between blocks is divided into two parts: one is structural similarity between two blocks: the other is distance similarity between two blocks. It is considered that the closer the two blocks are, the higher similarity they have, and vice verse. The similarity between two blocks is the product of the structural similarity and the distance similarity of the two blocks. The particular calculation equation is as follows:

$$W(m,n)=W_{Is}(m,n) \times W_d(m,n)$$

Wherein, W(m,n) represents the similarity between a block with m as its center and a block with n as its center. $W_{Is}(m,n)$ represents the structural similarity between two blocks, $W_d(m,n)$ represents the distance similarity between two blocks. The equations of the structural similarity $W_{Is}(m,n)$ and the distance similarity $W_d(m,n)$ are as follows:

$$w_{Is}(m,n)=e^{-\|l_m-l_n\|^2/\epsilon_1}$$

$$w_d(m,n)=e^{-\|C_m-C_n\|^2/\epsilon_2}$$

Wherein, L represents a vector composed of the center point and its neighbors, C represents the spatial coordinates of the center point, $\epsilon 1$ and $\epsilon 2$ are used to control the shapes of exponential functions. $\epsilon 1$ is in a range (10, 30), and $\epsilon 2$ is in a range (20, 40), the particular values of which may be determined experimentally. As to an image, a PSNR value may be obtained from each pair of $\epsilon 1$ and $\epsilon 2$. It has been found through experiments performed on a large amount of images that the algorithm has the best effect when $\epsilon 1$ is about 17 and $\epsilon 2$ is about 33.

A diagonal matrix P may be obtained through similarity calculation, the elements of which are composed of similarity W(m,n) between each block of the local area W and the center block. The following objective function F1 may be obtained through adding the diagonal matrix P to the objective function F.

$$\min_{y,a,b}\{\alpha\|y_c - Ay\|^2 + \beta\|y_c - By\|^2 + \lambda\|x - Dy_c\|^2\}$$

② defining a residual error vector R(y,a,b) according to the objective function F1.

$$R(y,a,b) = \begin{bmatrix} \sqrt{\alpha}\,P(I-A)y \\ \sqrt{\beta}\,P(I-B)y \\ \sqrt{\lambda}\,(x-Dy_c) \end{bmatrix}$$

Wherein, I represents an identity matrix of the length of yc, and the length of y is expanded with 0.

The objective function is converted to the following function F2:

$$\min_{\Delta y,\Delta a,\Delta b} |R(y,a,b) - C\Delta R|^2$$

This function is a non-linear function.

③ adding a minute variation ΔR is added to the objective function F2, which is then linearized to convert it to the following objective function3:

$$\min_{y,a,b} |R(y,a,b)|^2$$

Wherein, $$C = \begin{bmatrix} \sqrt{\alpha}\,P(-I+A_c) & \sqrt{\alpha}\,PE_1 & 0 \\ \sqrt{\beta}\,P(-I+B_c) & 0 & \sqrt{\alpha}\,PE_2 \\ \sqrt{\lambda}\,D & 0 & 0 \end{bmatrix}, \Delta R = [\Delta y\ \Delta a\ \Delta b]^T$$

E1 and E2 are constructed as follows: the ith rows thereof are a vector composed of the up, down, right, left neighbors and a vector composed of the up-left up-right, down-left, down-right neighbors of the ith pixel in the local area W, respectively. Ac, Bc represents the first c columns of A and B respectively, wherein c is the number of pixels that are not on the edges of the local area W; Δy, Δa and Δb represent minute variations of y, a and b respectively.

④ iterating the objective function F3 using the least square method. The initial value of y is set to a result of interpolation performed on the low resolution image, and all weight values of a and b are set to ¼. R(y, a, b) is updated using the result ΔR obtained from each iteration, and the iteration ends until ΔR is less than a specified threshold. The threshold is in a range of 0.1 to 1.

⑤ outputting the pixel value of the center block of the local area W.

(5) repeating steps (2) to (4) for all local areas in the image M to obtain an interpolated high resolution image.

Through the above method, image interpolation may be carried out based on autoregressive models on any scale.

Figure 4:
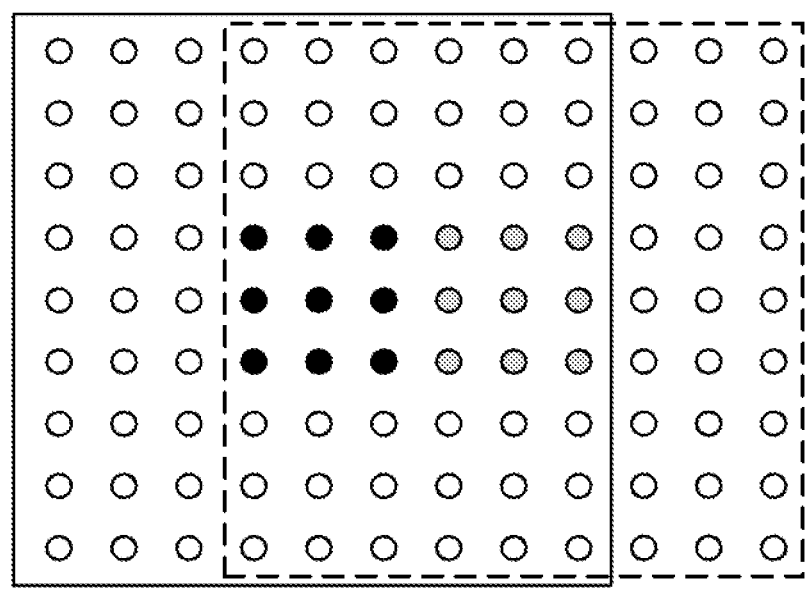
FIG. 4 is a schematic diagram of the effect of window moving for interpolating the complete low resolution image according to an embodiment of this invention.

As shown in FIG. 4, a window is moved by three pixels each time, i.e., an overlapped area between windows is provided to reduce the block effect while covering the complete image by points outputted from the window (except for portions on the image edges having a width of 3).

Figure 5:
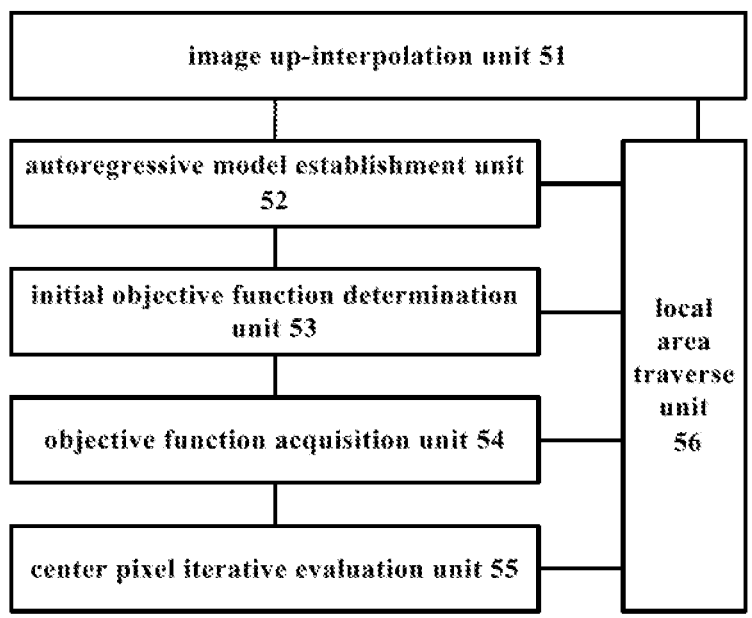
FIG. 5 shows a structural diagram of an image interpolation device according to an embodiment of this invention.

FIG. 5 shows a structural diagram of an image interpolation device according to an embodiment of this invention. As shown in FIG. 5, the device comprises: an image up-interpolation unit 51 for up interpolating a low resolution image to a target scale to obtain an up-interpolated image M; an autoregressive model establishment unit 52 for determining a local area W to be interpolated in the image M, establishing two autoregressive models, a horizontally perpendicular autoregressive model and a 45 degree diagonal autoregressive model, for each pixel point in the local area W except for the edge pixel points; an initial objective function determination unit 53 for determining an initial objective function F0 according to the autoregressive models: an objective function acquisition unit 54 for down sampling the local area W except for the edge pixel points to the same size as that of the low-resolution image, so as to obtain a local area W', subtracting a corresponding area in the low-resolution image from the local area W' on the basis of each pixel and adding the result to the initial objective function F0, so as to obtain an objective function F; a center pixel iterative evaluation unit 55 for performing iteration on the objective function F, so as to obtain a pixel point value of a centre block of the local area W.

Optionally, the device further comprises a local area traverse unit 56 for obtaining, for each local area in the image M, the pixel point values of a center block of the local area using the autoregressive model establishment unit, the initial objective function determination unit, the objective function acquisition unit, and the center pixel iterative evaluation unit, to obtain an interpolated high resolution image.

In one embodiment, the image up-interpolation unit up interpolates a low resolution image to a target scale using the bicubic interpolation method: or the horizontally perpendicular autoregressive model is composed of a pixel and its four up, down, left and right neighboring pixels, and the 45 degree diagonal autoregressive model is composed of a pixel and its four up-left, up-right, down-left and down-right neighboring pixels; or the local area W is in a range from 7*7 pixels to 15*15 pixels; or the objective function acquisition unit down samples the local area W except for the edge pixel points to the same size as that of the low-resolution image using the bicubic interpolation method.

In an embodiment the initial objective function determination unit weights the neighboring pixels for each autoregressive model and then subtracts them from the center pixel; sums up all autoregressive models within the complete local area W to minimize sum by the initial objective function F0.

In an embodiment, the center pixel iterative evaluation unit is used to calculate similarities between all blocks with the center block in the local area W, add the similarities to the objective function F to obtain an objective function F1; define a residual error vector according to the objective function F1 and convert the objective function F1 to F2; add a minute variation to the objective function F2, which is then is linearized to obtain an objective function F3; iterate the objective function F3 using the least square method until the minute variation is less than a specified threshold value. For example, the center pixel iterative evaluation unit calculates a structural similarity and a distance similarity between two blocks respectively, and uses the product of the structural similarity and a distance similarity as the similarity thereof; or the threshold value is in a range (0.1, 1); or the center block and the blocks are in a range from 3*3 pixels to 5*5 pixels.

One or more computer-readable medium having computer-executable instructions that when loaded on a computer execute an image interpolation, the method comprising: up interpolating a low resolution image to a target scale to obtain an up-interpolated image M; determining a local area W to be interpolated in the image M, establishing two autoregressive models, a horizontally perpendicular autoregressive model and a 45 degree diagonal autoregressive model for each pixel point in the local area W except for the edge pixel points, and determining an initial objective function F0 according to the autoregressive models; down sampling the local area W except for the edge pixel points to the same size as that of the low-resolution image, so as to obtain a local area W', subtracting a corresponding area in the low-resolution image from the local area W' on the basis of each pixel and adding the result to the initial objective function F0, so as to obtain an objective function F; solving the objective function F iteratively, so as to obtain a pixel value of a centre block of the local area W.

A computer having one or more computer readable medium with computer executable instruments thereon is further provided, the instrument when executed on the computer implementing the image interpolation method described above.

Exemplary Operation Environment

The computer or computing device described herein has hardware including one or more processors or processing units, system memory and some form of computer readable medium. As an example but not limitation, the computer readable medium comprises computer storage medium and communication medium. The computer storage medium comprises any volatile and non-volatile, movable or non-movable medium for storing computer readable instruments, data structures, program modules or other data information. The communication medium generally modulates data signals by carrier or in other transmission mechanism to represent computer readable instruments, data structures or other data, and may comprise any information transmission medium. Any combination of the above may be comprised in the range of the computer readable medium.

Various embodiments of the present invention may be described in a general context of computer executable instruments such as program modules executed on one or more computers or other devices. The computer executable instruments as software are organized into one or more computer executable components or modules. In general, the program modules comprise, but not limited to, routines, programs, objects, components and data structures executing specific tasks or implementing specific abstract data types. Various aspects of the present invention may be implemented using any number of such components or modules or their organizations. For example, various aspects of this invention are not limited to the specific computer executable instruments or specific components or modules that are shown in the figures and described herein. Other embodiments of this invention may comprise different computer executable instruments or components having more or less functions than that shown and described herein. Various aspects of this invention may be implemented in a distributed computing environment in which tasks are executed on remote processing devices that are linked through a communication network. In the distributed computing environment, the program modules may be located in local and remote computer storage medium, including memory storage devices.

Obviously those skilled in the art may make various changes and modifications to this invention without departing the spirit and scope of this invention. Thus, the present invention intends to encompass these changes and modifications so long as these modifications and changes are within the scope of claims of this invention and its equivalents.

What is claimed is:

1. An image interpolation method based on autoregressive models, comprising the following steps:
    (1) up interpolating a low resolution image to a target scale to obtain an up-interpolated image M;
    (2) determining a local area W to be interpolated in the image M, establishing two autoregressive models, a horizontally perpendicular autoregressive model and a 45 degree diagonal autoregressive model, for each pixel point in the local area W except for the edge pixel points, and determining an initial objective function F0 according to the autoregressive models;
    (3) down sampling the local area W except for the edge pixel points to the same size as that of the low-resolution image, so as to obtain a local area W', subtracting a corresponding area in the low-resolution image from the local area W' on the basis of each pixel and adding the result to the initial objective function F0, so as to obtain an objective function F;
    (4) solving the objective function F iteratively, so as to obtain pixel values of a center block of the local area W.

2. The image interpolation method according to claim 1, further comprising:
    (5) for all local areas in the image M, repeating steps (2) to (4) to obtain an interpolated high resolution image.

3. The image interpolation method according to claim 1, characterized in that the low resolution image is up interpolated to the target scale using the bicubic interpolation method in step (1).

4. The image interpolation method according to claim 1, characterized in that the horizontally perpendicular autoregressive model is composed of a pixel and its four up, down, left and right neighboring pixels, and the 45 degree diagonal autoregressive model is composed of a pixel and its four up-left, up-right, down-left and down-right neighboring pixels in step (2); and the local area W is in a range from 7*7 pixels to 15*15 pixels in step (2).

5. The image interpolation method according to claim 1, characterized in that the method of determining an initial objective function F0 according to autoregressive models in step (2) is as follows:

weighting the neighboring pixels for each autoregressive model and then subtracting them from the center pixel; summing up all autoregressive models within the complete local area W to minimize sum by the initial objective function F0.

6. The image interpolation method according claim 1, characterized in that: the local area W except for the edge pixel points is down sampled to the same size as that of the low-resolution image using the bicubic interpolation method in step (3).

7. The image interpolation method according to claim 1, characterized in that: the process of solving the objective function F iteratively in step (4) comprises the following steps:

calculating similarities between all blocks with the center block in the local area W, adding the similarities to the objective function F to obtain an objective function F1;

defining a residual error vector according to the objective function F1 and converting the objective function F1 to F2;

adding a minute variation to the objective function F2, which is then linearized to obtain an objective function F3;

iterating the objective function F3 using the least square method until the minute variation is less than a specified threshold value.

8. The image interpolation method according to claim 7, characterized in that: the similarity between a block and the center block is calculated as follows:

calculating a structural similarity and a distance similarity between the two blocks respectively, and using the product of the structural similarity and a distance similarity as the similarity thereof;

the threshold value is in a range (0.1, 1); and the center block is in a range from 3*3 pixels to 5*5 pixels in step (4).

9. An image interpolation device based on autoregressive models, comprising:

an image up-interpolation unit for up interpolating a low resolution image to a target scale to obtain an up-interpolated image M;

an autoregressive model establishment unit for determining a local area W to be interpolated in the image M, establishing two autoregressive models, a horizontally perpendicular autoregressive model and a 45 degree diagonal autoregressive model, for each pixel point in the local area W except for the edge pixel points;

an initial objective function determination unit for determining an initial objective function F0 according to the autoregressive models;

an objective function acquisition unit for down sampling the local area W except for the edge pixel points to the same size as that of the low-resolution image, so as to obtain a local area W', subtracting a corresponding area in the low-resolution image from the local area W' on the basis of each pixel and adding the result to the initial objective function F0, so as to obtain an objective function F;

a center pixel iterative evaluation unit for performing iteration on the objective function F, so as to obtain a pixel point values of a centre block of the local area W.

10. The image interpolation device according to claim 9, further comprising:

a local area traverse unit for obtaining, for each local area in the image M, the pixel point values of a center block of the local area using the autoregressive model establishment unit, the initial objective function determination unit, the objective function acquisition unit, and the center pixel iterative evaluation unit, to obtain an interpolated high resolution image.

11. The image interpolation device according to claim 9, characterized in that the image up-interpolation unit up interpolates a low resolution image to a target scale using the bicubic interpolation method;

the horizontally perpendicular autoregressive model is composed of a pixel and its four up, down, left and right neighboring pixels, and the 45 degree diagonal autoregressive model is composed of a pixel and its four up-left, up-right, down-left and down-right neighboring pixels;

the local area W is in a range from 7*7 pixels to 15*15 pixels; and the objective function acquisition unit down samples the local area W except for the edge pixel points to the same size as that of the low-resolution image using the bicubic interpolation method.

12. The image interpolation device according to claim 9, characterized in that the initial objective function determination unit weights the neighboring pixels for each autoregressive model and then subtracts them from the center pixel; sums up all autoregressive models within the complete local area W, to minimize sum by the initial objective function F0.

13. The image interpolation device according to claim 9, characterized in that the center pixel iterative evaluation unit is used to calculate similarities between all blocks with the center block in the local area W, add the similarities to the objective function F to obtain an objective function F1; define a residual error vector according to the objective function F1 and convert the objective function F1 to F2; add a minute variation to the objective function F2, which is then linearized to obtain an objective function F3; iterate the objective function F3 using the least square method until the minute variation is less than a specified threshold value.

14. The image interpolation device according to claim 13, characterized in that:

the center pixel iterative evaluation unit calculates a structural similarity and a distance similarity between two blocks respectively, and uses the product of the structural similarity and a distance similarity as the similarity thereof;

the threshold value is in a range (0.1, 1); and the blocks are in a range from 3*3 pixels to 5*5 pixels.

15. One or more non-transitory computer-readable medium having computer-executable instructions that when loaded on a computer execute an image interpolation, the method comprising:

up interpolating a low resolution image to a target scale to obtain an up-interpolated image M;

determining a local area W to be interpolated in the image M, establishing two autoregressive models, a horizontally perpendicular autoregressive model and a 45 degree diagonal autoregressive model, for each pixel point in the local area W except for the edge pixel points, and determining an initial objective function F0 according to the autoregressive models;

down sampling the local area W except for the edge pixel points to the same size as that of the low-resolution image, on as to obtain a local area subtracting a corresponding area in the low-resolution image from the local area W' on the basis of each pixel and adding the result to the initial objective function F0, so as to obtain an objective function F;

solving the objective function F iteratively, on as to obtain pixel values of a centre block of the local area W.

16. The image interpolation method according to claim 2, characterized in that: the local area W except for the edge pixel points is down sampled to the same size as that of the low-resolution image using the bicubic interpolation method in step (3).

17. The image interpolation method according to claim 3, characterized in that: the local area W except for the edge pixel points is down sampled to the same size as that of the low-resolution image using the bicubic interpolation method in step (3).

18. The image interpolation method according to claim 4, characterized in that: the local area W except for the edge pixel points is down sampled to the same size as that of the low-resolution image using the bicubic interpolation method in step (3).

19. The image interpolation method according to claim 5, characterized in that: the local area W except for the edge pixel points is down sampled to the same size as that of the low-resolution image using the bicubic interpolation method in step (3).

* * * * *